United States Patent
Barthes et al.

(10) Patent No.: US 12,139,193 B2
(45) Date of Patent: Nov. 12, 2024

(54) ASSESSMENT OF THE ABSOLUTE ANGULAR POSITION OF A STEERING WHEEL BY CONSIDERING ITS SITUATION WHEN SWITCHING OFF THE VEHICLE

(71) Applicant: JTEKT EUROPE, Irigny (FR)

(72) Inventors: Dimitri Barthes, Lyons (FR); André Michelis, Chonas l'Amballan (FR)

(73) Assignee: JTEKT EUROPE, Irigny (FR)

( * ) Notice: Subject to any disclaimer, the term of this patent is extended or adjusted under 35 U.S.C. 154(b) by 988 days.

(21) Appl. No.: 16/966,498

(22) PCT Filed: Jan. 29, 2019

(86) PCT No.: PCT/FR2019/050194
§ 371 (c)(1),
(2) Date: Jul. 31, 2020

(87) PCT Pub. No.: WO2019/150036
PCT Pub. Date: Aug. 8, 2019

(65) Prior Publication Data
US 2021/0053620 A1   Feb. 25, 2021

(30) Foreign Application Priority Data
Jan. 31, 2018 (FR) ..................... 18/50803

(51) Int. Cl.
*B62D 15/02* (2006.01)
*B62D 5/04* (2006.01)

(52) U.S. Cl.
CPC ......... *B62D 15/0235* (2013.01); *B62D 5/046* (2013.01); *B62D 15/0245* (2013.01)

(58) Field of Classification Search
CPC ............. B62D 15/0235; B62D 5/046; B62D 15/0245; B62D 15/024
See application file for complete search history.

(56) References Cited

U.S. PATENT DOCUMENTS

2004/0061500 A1* 4/2004 Lou .................. B62D 15/0245
                                                 324/332
2006/0293818 A1* 12/2006 Lu ................... B62D 15/0235
                                                 701/41
(Continued)

FOREIGN PATENT DOCUMENTS

DE   10 2007 021 625 A1   11/2008
FR        2 856 142 B1     9/2005
(Continued)

OTHER PUBLICATIONS

Mar. 28, 2019 International Search Report issued in International Patent Application No. PCT/FR2019/050194.
(Continued)

*Primary Examiner* — Sze-Hon Kong
(74) *Attorney, Agent, or Firm* — Oliff PLC

(57) ABSTRACT

A method for estimating the absolute angular position of a steering wheel equipping a power-steering device, referred to as "relative steering wheel position", of the shaft of a power-steering motor is assessed, a first estimation (Angle1) of the absolute angular position of the steering wheel is assessed from at least one first model using the speed difference between the left and right rear wheels, a first dynamic offset equal to the difference between the first estimation (Angle1) of the absolute angular position of the steering wheel and the relative steering wheel position is estimated, and the absolute angular position of the steering wheel is calculated by adding to the relative steering wheel position a total compensation offset determined from the first dynamic offset, also when restarting the vehicle, a switching-off offset corresponds to the value of the total compensation offset at the time when the vehicle was previously switched off.

10 Claims, 1 Drawing Sheet

(56) References Cited

U.S. PATENT DOCUMENTS

Figure 1:
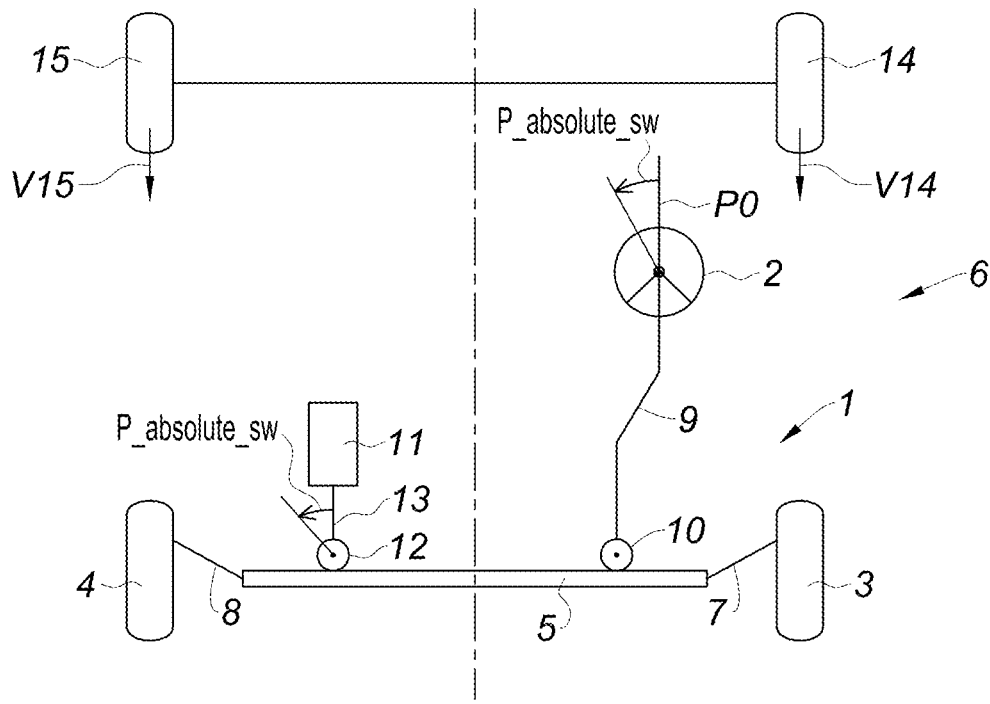

| | | | |
|---|---|---|---|
| 2007/0205762 A1* | 9/2007 | Nakata | G01D 5/2449 |
| | | | 324/207.25 |
| 2008/0140340 A1* | 6/2008 | Barthomeuf | B62D 15/0235 |
| | | | 702/151 |
| 2010/0235052 A1* | 9/2010 | Shartle | B62D 15/0245 |
| | | | 701/41 |
| 2013/0024072 A1* | 1/2013 | Michelis | B62D 15/0235 |
| | | | 701/42 |
| 2014/0288779 A1 | 9/2014 | Di Cairano | |
| 2016/0046320 A1* | 2/2016 | Takahashi | B62D 5/04 |
| | | | 180/446 |
| 2016/0152265 A1* | 6/2016 | Codonesu | B62D 6/002 |
| | | | 701/42 |
| 2017/0029022 A1* | 2/2017 | Nakamura | B62D 5/0487 |
| 2018/0015946 A1* | 1/2018 | Kodera | B62D 5/0478 |
| 2018/0111642 A1* | 4/2018 | Endo | B62D 6/008 |
| 2018/0319440 A1* | 11/2018 | Ernstson | B62D 5/0421 |
| 2020/0309566 A1* | 10/2020 | Fujita | G01L 5/221 |

FOREIGN PATENT DOCUMENTS

| | | |
|---|---|---|
| FR | 2 876 972 A1 | 4/2006 |
| FR | 2 894 550 A1 | 6/2007 |
| FR | 2 953 181 A1 | 6/2011 |
| FR | 2 992 937 A1 | 1/2014 |
| JP | 2013-241131 A | 12/2013 |

OTHER PUBLICATIONS

Mar. 28, 2019 Written Opinion issued in International Patent Application No. PCT/FR2019/050194.

\* cited by examiner

ASSESSMENT OF THE ABSOLUTE ANGULAR POSITION OF A STEERING WHEEL BY CONSIDERING ITS SITUATION WHEN SWITCHING OFF THE VEHICLE

The present invention concerns power steering devices which comprise a function called «ANgle Finding» (abbreviated as «ANF») allowing to assess the absolute angular position of a steering wheel relative to the central position which corresponds to a trajectory in a straight line of the vehicle.

The patent application FR-2 992 937 filed by the applicant describes a method for implementing such an angle finding function.

The general principle of this method consists in measuring a value called «steering wheel relative position» P_relative_SW which corresponds to the measurement of the absolute angular position of the assist motor shaft expressed in a first reference frame (relative) attached to the assist motor, then correct this steering wheel relative position value by applying a compensation value («offset») Offset_final which corresponds to the angular shift, which can vary over time, between the first reference frame attached to the assist motor and a second reference frame which is attached to the steering wheel (and more particularly which is attached to the fixed support, secured to the vehicle, relative to which the steering wheel turns).

The absolute angular position of the steering wheel P_absolute_SW, expressed relative to the central position of a straight line in the reference frame attached to the steering wheel, is therefore:

$$P\_absolute\_SW = P\_relative\_SW + Offset\_final$$

The compensation value (offset) Offset_final is determined, substantially in real time, from a model, or preferably from several models, called «dynamic models», which allow assessing the steering angle of the power steering system from dynamic parameters of the vehicle, such as, for example, and without limitation, the yaw rate of the vehicle or even the speed deviation between the two wheels of the rear axle of the vehicle, and typically based on a so-called «Jeantaud/Ackermann» geometric representation.

More particularly, at each iteration n, it is possible to define, for each dynamic model, a dynamic offset OffsetDYN which is equal to the difference, for the concerned iteration, between on the one hand the steering angle assessed from the considered dynamic model and on the other hand the steering wheel relative position P_relative_SW expressed in the reference frame attached to the assist motor.

We can then calculate the compensation value Offset_final as being equal to a weighted sum of the dynamic offset values OffsetDYN which have been determined on a series of iterations, or even on all of the iterations carried out since the start of the vehicle, each dynamic offset value being weighted by a weighting coefficient, called «score», which represents an index of confidence that one can have in the estimate resulting from the dynamic model, taking into account the life situation of the vehicle.

By such a form of evolutionary learning, one can thus obtain for example a compensation value Offset_final of the type:

$$Offset_{final}(n) = \frac{Offset_{RS}(n) * \sum Score_{RS}(n) + Offset_{YR}(n) * \sum Score_{YR}(n)}{\sum Score_{RS}(n) + \sum Score_{YR}(n)}$$

with $$Offset_{RS}(n) = \frac{OffsetDYN_{RS}(n) * Offset_{RS}(n) + Offset_{RS}(n-1) * \sum Score_{RS}(n-1)}{\sum Score_{RS}(n)} \text{ and}$$

$$Offset_{YR}(n) = \frac{OffsetDYN_{YR}(n) * Score_{YR}(n) + Offset_{YR}(n-1) * \sum Score_{YR}(n-1)}{\sum Score_{YR}(n)} \text{ and}$$

$$\sum Score_{RS}(n) = \sum Score_{RS}(n-1) + Score_{RS}(n)$$

$$\sum Score_{YR}(n) = \sum Score_{YR}(n-1) + Score_{YR}(n)$$

where

OffsetDYN_RS (n) is a first obtained dynamic offset, for the considered iteration n, from a first dynamic model using the rear speed deviation («Rear Speed»);

Score_RS (n) is the weighting coefficient applicable to the first dynamic offset at the considered iteration;

OffsetDYN_YR (n) is a second obtained dynamic offset, for the considered iteration n, from a second dynamic model using the («Yaw Rate») of the vehicle;

Score_YR (n) is the weighting coefficient applicable to the second dynamic offset at the considered iteration;

Σ . . . (n) is the sum operation of the n concerned successive values (sum of i=1 to n).

The inventors have noted, nonetheless, that, despite the precision and reliability of the angle finding method described in the aforementioned patent application, there could sometimes be some difficulties during the implementation of said method, in particular related to the sensor technology for measuring I value known as «steering wheel relative position» P_relative_SW.

Indeed, after switching off the vehicle's ignition («power-OFF»), it is necessary to proceed, during the next start, that is to say during the ignition switching on («power-ON»), to the acquisition of a sufficient number of reliable dynamic data, and therefore of a sufficient number of reliable OffsetDYN dynamic offset values, to be able to reach a global score (sum of the scores obtained in successive iterations) which is sufficiently high for that we can trust the estimation of the angular position of the steering wheel.

Consequently, it is sometimes difficult to quickly dispose an accurate estimation of the absolute angular position of the steering wheel, immediately after switching on the vehicle. However, the required time to acquire and make reliable the estimation of the angular position of the steering wheel can temporarily make the functions that depend on this estimation of the absolute angular position of the steering wheel unavailable.

The objects assigned to the invention therefore aim to remedy the aforementioned drawbacks, and to propose a new improved method for estimating the absolute angular position of a steering wheel, which allows rapid and reliable provision of the estimation of the absolute angular position of the steering wheel, particularly just after the vehicle is switched on.

The objects assigned to the invention are achieved by means of a method for estimating the absolute angular position of a steering wheel equipping a power steering device, method during which:

the position, called «steering wheel relative position», of a movable member of the steering device other than the steering wheel is measured, for example the position of the shaft of an assist motor of said power steering device, at least a first estimate of the absolute angular position of the steering wheel is assessed from at least a first model based on the analysis of a first rolling parameter representative of the dynamics of the vehicle, such as the speed difference between the left and right wheels of the same rear axle, a first dynamic offset which is representative of the difference between the first estimate of the absolute angular position of the steering wheel and the steering wheel relative position is assessed, the absolute angular position of the steering wheel is calculated by adding to the steering wheel relative position a total compensation offset, which is determined from the first dynamic offset, said method being characterized in that, during a switching off of the vehicle, the value, called «switching off offset», which is taken by the total compensation offset at the time of said switching off, is recorded and in that, during the next restart of the vehicle, the total compensation offset is calculated by taking into account said switching off offset.

Advantageously, by memorizing the switching off offset, the method makes it possible to keep, between the switching off and the next vehicle start, an information on what was, at the time when the switching off occurred, the shift between the reference frame associated with the movable member used to measure the steering wheel relative position and the reference frame attached to the steering wheel, in which one wishes to know the absolute position of the steering wheel.

By recalling this switching off offset value at the time of restart, and by using it as a basis for evaluating the new total compensation offset applicable as soon as the vehicle is restarted, rather than arbitrarily and artificially considering that the total compensation offset has been reset to zero during the switching off, the advantage of the learning which was carried out before the switching off is advantageously retained, and a total compensation offset can therefore be immediately determined, directly applicable for calculating the absolute angular position of the steering wheel.

The method according to the invention therefore makes it possible not to start again, when the vehicle is started, from a situation in which the total compensation offset would be indeterminate or at the very least imprecise.

Since a reliable value of the total compensation offset is available from the start, it is possible to produce without delay a reliable estimate of the absolute angular position of the steering wheel from said total compensation offset, as soon as the measurement of the position of the movable member is refreshed, typically the measurement of the angular position of the shaft of the assist motor, that is to say as soon as the relative position of the steering wheel is refreshed.

Of course, the power steering device, implementing the described method, comprises an architecture making it possible to record a reliable value of the switching off offset in a non-volatile memory so that said value is available from the start.

Furthermore, as will be seen below in the description, it is possible to weight the memorized switching off offset as a function of the reliability of the latter, and thus to correct said switching off offset if necessary by means of a score of appropriate weighting. In this way, the reliability of the process for calculating the absolute angular position of the steering wheel is optimized, by avoiding introducing into said calculation a switching off offset which would be distorted, and therefore inaccurate, due to an unknown shift which would have occurred between the assist motor reference frame system and the reference frame system attached to the steering wheel.

Other objects, characteristics and advantages of the invention will appear in more detail on reading the description which follows, as well as with the aid of the appended drawings, provided for purely illustrative and non-limiting purposes, among which:

FIG. 1 schematically illustrates a vehicle provided with a power steering device applying the method according to the invention.

Figure 2:
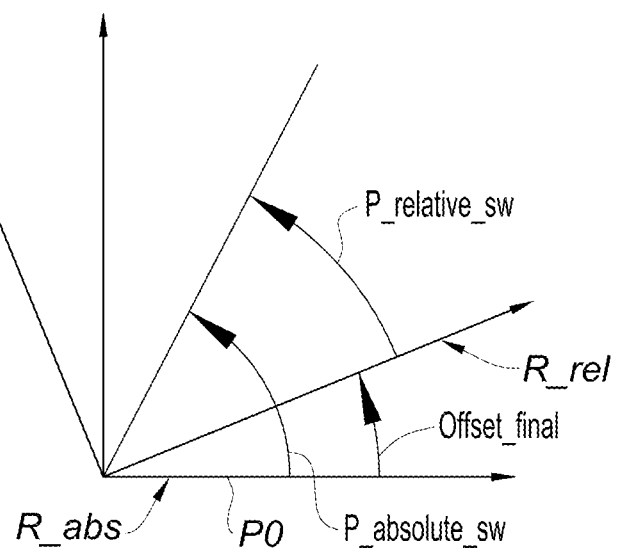

FIG. 2 illustrates the principle of offset compensation to arrive at a value of absolute angular position of the steering wheel from a relative position of the steering wheel.

The present invention concerns a method for estimating the absolute angular position P_absolute_SW of a steering wheel 2 equipping a power steering device 1.

In a manner known per se, and as illustrated in FIG. 1, the power steering device 1 comprises a steering wheel 2 allowing the driver to define the heading of the vehicle, as well as a steering mechanism making it possible to orient one or more steered wheels 3, 4.

Said steering mechanism may preferably comprise a rack 5, mounted movable in translation in a steering casing intended to be fixed to the frame of a vehicle 6.

The ends of said rack 5 are connected to steering tie rods 7, 8, themselves connected to stub axles which can be oriented in yaw and carrying the steered wheels 3, 4.

Preferably, the steering wheel 2 is mechanically connected to the rack 5 by a steering column 9 which carries a drive pinion 10 which meshes with said rack 5.

Nonetheless, the invention could perfectly be applied to a power steering device of the «steer by wire» type, devoid of a mechanical connection for direct movement transmission between the steering wheel 2 and the rack 5.

The device 1 also comprises an assist motor 11, preferably an electric motor, for example brushless motor.

Preferably, said assist motor 11 will be a rotary motor.

The assist motor 11, preferably coupled to a reduction gear, can be engaged on the rack 5 either through the steering column 9, or directly by means of a coupling member 12 distinct from the drive pinion 10, such as for example a secondary pinion or a ball screw.

The absolute angular position P_absolute_SW of a steering wheel 2 corresponds to the angular position occupied by the steering wheel 2, at a considered instant, with respect to a central position P0 which corresponds to a straight line trajectory of the vehicle 6.

Preferably, the useful travel of the steering wheel being greater than one turn in each direction (to the left or on the contrary to the right) relative to the central position P0, so that the total possible travel of the steering wheel 2 is for example of three turns, the absolute angular position therefore corresponds to a multi-turn position, which can thus be greater than 360 degrees (equivalent to one turn).

This absolute angular position of the steering wheel P_absolute_SW is expressed in a first reference frame R_abs attached to the fixed support of the steering wheel 2. This first reference frame R_abs can in practice be assimilated to the reference frame attached to the frame of the vehicle.

During the method according to the invention, the position called «steering wheel relative position» P_relative_SW, of a movable member 13 of the steering device 1, other than the steering wheel 2, is measured.

Said movable member 13 is selected so that its position is correlated with the absolute angular position of the steering wheel 2.

For example, it is possible to choose as a movable member the (rotary) shaft of the assist motor 11 of the power steering device 1.

The steering wheel relative position P_relative_SW will then correspond to the absolute angular position of the shaft 13 of the assist motor 11.

The steering wheel relative position P_relative_SW will be expressed in a second reference frame R_rel, with respect to which the movements of the movable member 13 take place.

Preferably, the second reference frame will be attached to the assist motor 11, and more particularly to the stator of said assist motor 11.

Thus, preferably, the steering wheel relative position P_relative_SW will correspond to the absolute angular position of the shaft 13 of the assist motor 11, expressed in a second reference frame R_rel attached to the stator of the assist motor.

This position can be measured by means of an appropriate position sensor, for example of the resolver type, preferably integrated into the assist motor 11.

Ideally, the first reference frame R_abs attached to the fixed support of the steering wheel 2 and the second reference frame R_rel attached to the assist motor 11 should be superimposed. Nonetheless, in practice, it can be seen the appearance and the fluctuation of an angular shift between said reference frames, which must be characterized, and thus taken into consideration, by the calculation of a total compensation offset Offset_final, such as that will be detailed below.

During the method according to the invention, at least a first estimate Angle1 of the absolute angular position of the steering wheel 2 is also assessed from at least a first model which is based on the analysis of a first rolling parameter representative of the vehicle dynamics.

This first rolling parameter could for example be the difference in speed (of rotation) V14-V15 between the left 14 and right 15 wheels of the same rear axle.

These speeds can for example be measured by the antilock brake system (ABS).

From this information on the difference in speeds of the rear wheels 14, 15, it is possible to determine, with reference to the Jeantaud-Ackermann geometric construction, the radius of curvature of the trajectory of the vehicle 6 at the considered instant, and consequently the lateral acceleration of the vehicle, then deducing therefrom the steering angle of the steered wheels 3, 4 and, consequently, a first estimate Angle1 of the absolute angular position of the steering wheel 2.

Such a first model is in particular described in the patent application FR-2 992 937 filed by the applicant, which can therefore be considered as incorporated by reference, for all useful purposes.

Alternatively, said first model could of course use any other rolling parameter which makes it possible to characterize the lateral dynamics of the vehicle 6 and thus to obtain an evaluation of the angular position of the steering wheel.

For example, the yaw speed of the vehicle 6 could thus be used as a rolling parameter, as also described in the above-mentioned application.

In what follows, reference will preferably be made, for the sake of convenience of description, to parameters and estimates, carrying the extension_RS, which are derived from, or relating to, a first model using the difference in speed of the rear wheels, it being understood that, without departing from the scope of the invention, they could be replaced by parameters or estimates relating to any other appropriate model, in particular to a model based on yaw speed, identified by the extension_YR.

During the method according to the invention, a first dynamic offset OffsetDYN_RS is assessed which is representative of, and more preferably equal to, the difference between the first estimate Angle1 of the absolute angular position of the steering wheel 2 (obtained by means of the first model) and the steering wheel relative position P_relative_SW (preferably obtained by measuring the position of the shaft 13 of the assist motor 11):

$$\text{OffsetDYN\_RS} = \text{Angle1} - P\_\text{relative\_SW}$$

Since the first estimate Angle1 provided by the dynamic model and the steering wheel relative position P_relative_SW provided from the measurement of the position of the movable member 13 (here the shaft 13 of the assist motor 11) in principle represent the same physical quantity, namely the absolute angular position of the steering wheel 2, this first dynamic offset OffsetDYN_RS thus gives a first evaluation of the difference (shift) which exists, at the considered instant, between the first reference frame R_abs attached to the fixed support of the steering wheel 2 and the second reference frame R_rel attached to the assist motor 11.

This difference can for example be due to measurement errors or to a drift of the resolver type sensor, which is responsible for measuring the relative position of the steering wheel P_relative_SW, that is to say more particularly of the sensor which is responsible for measuring the angular position of the shaft 13 of the assist motor 11.

The process is repeated successively over time.

Thus, at each iteration n, the measurement of the steering wheel relative position P_relative_SW (n), the first estimate Angle1(n) of the absolute angular position of the steering wheel 2 provided by the first model, and therefore the calculation of a first corresponding dynamic offset OffsetDYN_RS(n) are refreshed.

In accordance with the method according to the invention, it is then possible to determine, from the first dynamic offset OffsetDYN_RS, a total compensation offset Offset_final, and calculate the absolute angular position of the steering wheel P_absolute_SW by adding to the steering wheel relative position P_relative_SW said total compensation offset Offset_final:

$$P\_\text{absolute\_SW} = P\_\text{relative\_SW} + \text{Offset\_final}$$

Preferably, the calculation of the total compensation offset Offset_final(n), applicable to the considered iteration n, involves a weighted average of several successive first dynamic offsets OffsetDYN_RS (n) which are each weighted by a score of weighting of first dynamic offset Score_RS (n).

Said weighted average may be expressed in the form of a quotient, whose numerator comprises (at least) the sum, preferably over the n concerned iterations, of the product OffsetDYN_RS (n)*Score_RS (n), and whose denominator comprises (at least) the sum of the weighting scores Score_RS (n) on these same iterations.

According to the invention, during a switching off of the vehicle («power OFF»), the value is recorded, and more particularly the last value, called «switching off offset» Offset_save, which is taken by the total compensation offset Offset_final at the time of said switching off:

$$\text{Offset\_save} = \text{Offset\_final}(\text{Power OFF})$$

In practice, this switching off offset Offset_save will correspond more particularly to the last value of the total compensation offset Offset_final refreshed before the switching off, at the time or during the iteration which immediately precedes the switching off time (key cut).

During the next restart of the vehicle («power ON»), that is to say when the ignition is switched on, then during the iterations which follow said restart, the total compensation offset Offset_final can then advantageously be calculated by considering said switching off offset Offset_save.

Thus, we can formalize the calculation of the total compensation offset in the form of a function of the type:

Offset_final=$f$(OffsetDYN_RS,Offset_save)

As indicated above, the fact of memorizing and saving a switching off offset Offset_save until the next start, and completing the calculation of the total compensation offset Offset_final by involving in said calculation, during the resumption post-start of said calculation, a switching off offset parameter Offset_save acquired at the time of the previous switching off, makes it possible to dispose, when the vehicle 6 is restarted, an information element which facilitates the rapid provision of a reliable total compensation offset Offset_final, and therefore rapid provision of a calculated absolute angular position P_absolute_SW of the steering wheel 2.

Generally, the invention therefore consists in adding to a calculation of the absolute angular position of a steering wheel, when restarting a vehicle, the taking into account of historical information on a parameter used to perform said calculation, here taking into account a switching off offset Offset_save which is memorized during a switching off, here preferably memorized at the time of (preferably just before) the last switching off.

The invention thus makes it possible to ensure, despite one or more successive switching off and restart cycles, a continuity in the learning process of the total compensation offset Offset_final and therefore a continuity (or a quasi-continuity) in the availability of the absolute angular position of the steering wheel P_absolute_SW.

According to a particularly preferred characteristic which can constitute an invention in its own right, the switching off offset Offset_save is weighted, during the calculation of the total compensation offset Offset_final, by a switching off offset weighting score Score_save whose value is adjusted according to conditions under which the switching off is occurred.

By resuming the formalism used above, we can therefore write:

Offset_final=$f$(OffsetDYN_RS, Offset_save*Score_save)

In practice, the weighting score Score_save corresponds to a confidence index which characterizes the reliability of the total compensation offset acquired at the time of the switching off, that is to say which characterizes the reliability of the switching off offset Offset_save, and therefore which quantifies the capacity of said switching off offset Offset_save to faithfully represent the situation in which the power steering device 1 finds itself when the ignition is switched off, then at the time of the next restart.

This weighting score Score_save of the switching off offset is all the higher as the life situation of the vehicle 6 had made it possible to determine, just before the switching off occurs, a reliable total compensation offset Offset_final.

This is in particular the case when, in the minutes preceding the ignition switching off, the vehicle has been driven in driving conditions favorable to the first model, for example by achieving, at sufficiently high longitudinal speeds, typically more than 5 km/h, and on a non-slippery road, a course substantially in a straight line without any particular action by the driver on the steering wheel 2.

Conversely, we can reduce (in absolute value), or even cancel (set to zero), said weighting score Score_save of the switching off offset so as to reduce the influence of said switching off offset Offset_save in the calculation of the new total compensation offset Offset_final after restart, or even so as to not take account of said switching off offset Offset_save in the calculation of the new total compensation offset Offset_final after restart, if it is judged that said switching off offset Offset_save is erroneous or does not present sufficient reliability.

This may for example be the case if the vehicle 6 has circulated little before the ignition is switched off, so that the data acquired were insufficiently reliable or insufficient in number to validly calculate a total compensation offset Offset_final, or even if the switching off is occurred under conditions conducive to the appearance of an uncontrolled shift between the first reference frame R_abs attached to the fixed support of the steering wheel 2 and the second reference frame R_rel attached to the assist motor 11, and therefore under suitable conditions on the generation of a badly quantified error in the evaluation of the total compensation offset Offset_final.

Such an uncontrolled shift could, for example, occur in the event of a failure in the measurement of the absolute angular position of the steering system between the ignition switching off and the next vehicle start.

In all cases, the introduction of the weighting score of the switching off offset Score_save, in the calculation of the total compensation offset Offset_final, and therefore ultimately in the calculation of the absolute angular position of the steering wheel P_absolute_SW, advantageously makes it possible to correct the influence of said switching off offset Offset_save on a case-by-case basis, and more particularly to favor this influence all the more when the switching off offset Offset_save value is reliable.

If the calculation of the total compensation offset Offset_final preferably involves a weighted average of several successive first dynamic offsets OffsetDYN_RS (n) which are each weighted by a weighting score of the first dynamic offset Score_RS (n), as indicated above, then the value set for the switching off offset weighting score Score_save may preferably depend on the value reached, at the time of the switching off, by a first global reference score Score_RS_ref which corresponds to the cumulative sum of the scores of weighting of the first dynamic offset (at the time of the switching off PowerOFF and the recording of the switching off offset).

For convenience, we can therefore represent the determination of the weighting score of the switching off offset Score_save in the form of a law denoted by «g» of the type:

Score_save=$g$(Score_RS_ref), with

Score_RS_ref=$\Sigma$Score_RS($n$=PowerOFF)

The first global reference score Score_RS_ref is advantageously representative of the overall degree of reliability of the calculation of the total compensation offset Offset_final which is derived from the estimates provided by the first model.

When this first global reference score Score_RS_ref is high, and more particularly when it exceeds a predetermined threshold S1, S2, this means that the risk of error on the value of the total compensation offset Offset_final is reduced, because the estimates made by the first model were carried out under favorable conditions, and therefore received high weighting scores Score_RS (n), guarantees of reliability, and/or because the weighted average contains a large number of terms, and therefore based on a large number of weighting scores Score_RS (n) and a large number of successive evaluations of the dynamic offset OffsetDYN_RS (n), which statistically reduces the probability of a high error, even if some values of the series of these terms are individually uncertain or faulty.

Preferably, the first global reference score Score_RS_ref can be compared with increasing score thresholds SI, S2 which delimit a number N of reliability levels, preferably exactly three reliability levels L1, L2, L3, classified by increasing degree of reliability, and the switching off offset weighting score Score_save can then receive a predefined value Score_save_L1, Score_save_L2, Score_save_L3, associated with the reached reliability level L1, L2, L3, which is all the higher as the achieved reliability level is high.

Formally, we can therefore have, for example in the form of a correspondence table (which corresponds to the above-mentioned law «g»):
if Score_RS_ref<S1, level L1 with low or no reliability, then Score_save=Score_save_L1;
if S1<Score_RS_ref<S2, level L2 of average reliability, then Score_save=Score_save_L2;
if S2<Score_RS_ref, level L3 of high reliability, then Score_save=Score save_L3;
with Score_save_L1<Score_save_L2<Score_save_L3.

It will be noted that a limited number of reliability levels L1, L2, L3 (for example three levels), and therefore a limited number of possible values (for example three possible values) of the weighting score of the switching off offset Score_save, makes it possible to limit the complexity of the calculations while bringing in practice a sufficient degree of precision and reliability.

According to a preferential possibility of implementing the invention, at least a second estimate Angle2 of the absolute angular position of the steering wheel 2 is assessed from at least one second model which is based on the analysis of a second rolling parameter representative of the vehicle dynamics, distinct from the first rolling parameter.

This second rolling parameter may for example be the yaw speed of the vehicle, or even a measure of the lateral acceleration of the vehicle.

The yaw speed and/or the measurement of lateral acceleration could for example be provided by an electronic trajectory stability control system (ESP).

From this information on the yaw speed (or on lateral acceleration), it is possible to determine, with reference to the mechanic laws, the radius of curvature of the trajectory of the vehicle 6 at the considered instant, then deduce therefrom the steering angle of the steered wheels 3, 4 and therefore provide a (second) estimate angle2 of the absolute angular position of the steering wheel 2.

Such a second model is in particular described in patent application FR-2 992 937 filed by the applicant, which can therefore be considered as incorporated by reference for this purpose.

By taking an approach similar to that described above with reference to the first model, we can then assess a second dynamic offset OffsetDYN_YR which is representative of the difference between the second estimate of the absolute angular position of the steering wheel Angle2 and the relative position of the steering wheel P_relative_SW (the latter corresponding more particularly here to the absolute angular position of the shaft 13 of the assist motor 11, considered in the reference frame R_rel attached to the stator of said assist motor 11):

$$OffsetDYN\_YR = Angle2 - P\_relative\_SW$$

Ultimately, we can then preferentially calculate the total compensation offset Offset_final by carrying out a weighted average:
(i) of first dynamic offsets OffsetDYN_RS (n) successively assessed (from the first model) on several successive iterations n and each assigned a weighting score of first dynamic offset Score_RS (n),
(ii) of second dynamic offsets OffsetDYN_YR (n) successively assessed (from the second model) on said several successive iterations n and each assigned a weighting score of second dynamic offset Score_YR (n),
(iii) and of the switching off offset Offset_save weighted by the switching off offset weighting score Score_save.

This can be formally expressed by:

$$Offset_{final}(n) = \frac{Offset_{RS}(n) * \sum Score_{RS}(n) + Offset_{YR}(n) * \sum Score_{YR}(n) + Offset_{SAVE} * Score_{SAVE}}{\sum Score_{RS}(n) + \sum Score_{YR}(n) + Score_{SAVE}}$$

with $$Offset_{RS}(n) = \frac{OffsetDYN_{RS}(n) * Score_{RS}(n) + Offset_{RS}(n-1) * \sum Score_{RS}(n-1)}{\sum Score_{RS}(n)}$$ and $$Offset_{YR}(n) = \frac{OffsetDYN_{YR}(n) * Score_{YR}(n) + Offset_{YR}(n-1) * \sum Score_{YR}(n-1)}{\sum Score_{YR}(n)}$$ and $$\sum Score_{RS}(n) = \sum Score_{RS}(n-1) + Score_{RS}(n)$$

$$\sum Score_{YR}(n) = \sum Score_{YR}(n-1) + Score_{YR}(n)$$

where
OffsetDYN_RS (n) is the first obtained dynamic offset, for the considered iteration n, from the first dynamic model, which preferentially uses as a rolling parameter the speed deviation of the rear wheels («Rear Speed»);
Score_RS (n) is the weighting coefficient applicable to the first dynamic offset at the considered iteration;
OffsetDYN_YR (n) is the second obtained dynamic offset, for the iteration considered n, from the second dynamic model, which preferentially uses the yaw rate of the vehicle as a rolling parameter;
Score_YR (n) is the weighting coefficient applicable to the second dynamic offset at the considered iteration;
Σ . . . (n) is the sum operation of the n concerned successive values (sum of i=1 to n).

The presence, in the weighted average above, of the term Offset_save*Score_save advantageously makes it possible to take into consideration, in a simple manner, the switching off offset Offset_save, and to measure, by means of the weighting score Score_save, the influence of said switching off offset in the calculation of the total compensation offset Offset_final.

Of course, as a variant, the invention, and therefore the above formulas, could be adapted, in particular by adding or deleting the corresponding terms in the weighted average explained above, to a method which would use only one of the two models mentioned above, or else who would use a third model based on a third rolling parameter to estimate a third dynamic offset which would participate in the calculation of the total compensation offset Offset_final.

Preferably, when the method uses several models, in this case preferably a first and a second model, to determine several series of corresponding dynamic offsets, here a series of first dynamic offsets OffsetDYN_RS (n) and a series of second offsets dynamic OffsetDYN_YR (n), then the weighting score of the switching off offset Score_save can be determined according to the maximum between on the one hand a first global reference score Score_RS_ref equal to the cumulative sum of the weighting scores of the first dynamic offset (at the time of the switching off PowerOFF and the recording of the switching off offset):

Score_$RS$_ref=ΣScore_$RS$($n$=PowerOFF)

and on the other hand a second global reference score Score_YR_ref equal to the cumulative sum of the weighting scores of the second dynamic offset (at the time of the switching off PowerOFF and the recording of the switching off offset):

Score_$YR$_ref=>Score_$YR$($n$=PowerOFF).

This can be formalized in the form:

Score_save=g($X$), with $X$=MAX(Score_$RS$_ref;Score_$YR$_ref)

that is to say $X$=MAX[Score_$RS$($n$=PowerOFF);ΣScore_$YR$($n$=PowerOFF)]

Of course, here again, the function g above can be adapted as a function of the number of models used and the number of distinct dynamic offset series thus established, in order to calculate a global reference score for each of said series, and to search, to determine the applicable switching off offset weighting score value Score_save, the maximum global reference score X from the set of global reference scores thus considered.

Advantageously, the use of the maximum $\underline{X}$ makes it possible to test in a simple way whether at least one of the models used has provided sufficient reliable data, before the switching off, so that one can rely on the recorded switching off offset.

Indeed, if at least one of the global reference scores Score_RS_ref, Score_YR_ref, and in particular if at least the highest of the said global reference scores, reaches or exceeds a predetermined threshold S1, S2, then this means that at least the corresponding model has totaled, before the switching off, enough reliable data so that the total compensation offset which is calculated from these data, and therefore the recorded switching off offset Offset_save, is representative of reality, with a reasonable degree of certainty.

Preferably, analogously to what has been described above with reference to the first global reference score Score_RS_ref, the maximum $\underline{X}$ between the first and the second global reference score can be compared with increasing score thresholds S1, S2 which delimit a number N of reliability levels L1, L2, L3, preferably exactly three levels of reliability, classified by increasing degree of reliability, and the switching off offset weighting score Score_save can then receive a predefined value Score_save_L1, Score_save_L2, Score_save_L3, associated with the reached level of reliability, which is all the higher as the reached reliability level L1, L2, L3 is high.

We could apply for example the following correspondence table:

if $X<S1$, level L1 of low or even zero reliability, then Score_save=Score save_L1;

if $S1<X<S2$, level L2 of average reliability, then Score_save=Score save_L2;

if $S2<X$, level L3 of high reliability, then Score_save=Score_save_L3;

with Score_save_L1<Score_save_L2<Score_save_L3.

Advantageously, the switching off offset weighting values score_save are comprised in the same range (for example between 0 and 1) as the weighting scores Score_RS, Score_YR likely to be assigned to dynamic offsets.

Of course, the invention also concerns, as such, to a power steering device 1 equipped with a computer arranged or programmed to execute a method according to any of the variant embodiments of the invention, as well as a vehicle 6 provided with such a power steering device 1.

Furthermore, the invention is in no way limited to the variants described in the foregoing, one skilled in the art being in particular able to isolate or freely combine together all or part of the above characteristics.

The invention claimed is:

1. A method for estimating the absolute angular position (P_absolute_SW) of a steering wheel equipping a power steering device, the method comprising:

by a computer,
measuring a steering wheel relative position (P_relative_SW), corresponding to measurement on an absolute angular position of a movable member of the power steering device other than the steering wheel expressed in a first reference frame, determining at least a first estimate (Angle1) of the absolute angular position of the steering wheel from at least a first model based on analysis of a first rolling parameter representative of vehicle dynamics, calculating a first dynamic offset (OffsetDYN_RS) which is representative of a difference between the first estimate (Angle1) of the absolute angular position of the steering wheel and the steering wheel relative position (P_relative_SW), calculating the absolute angular position of the steering wheel by adding to the steering wheel relative position (P_relative_SW) a total compensation offset (Offset_final), which is determined from the first dynamic offset (OffsetDYN_RS), wherein, when the vehicle is switched off,
the computer records a switching off offset (Offset_save) IN a memory, the switching off offset (Offset_save) being a current total compensation offset at a time of said ignition switching off, and, on a next restart of the vehicle, the computer retrieves the switching off offset (Offset_save) from the memory and calculates the total compensation offset (Offset_final) while taking into account said switching off offset (Offset_save), and the movable member assists in controlling steering of the vehicle by the power steering device.

2. The method according to claim 1 wherein, during the calculation of the total compensation offset (Offset_final), the switching off offset (Offset_save) is weighted by a switching off offset weighting score (Score_save) whose value is adjusted according to conditions under which the ignition was switched off.

3. The method according to claim 1 wherein the calculation of the total compensation offset (Offset_final (n)) involves a weighted average of several successive first dynamic offsets (OffsetDYN_RS (n)) which are each weighted by a first dynamic offset weighting score (Score_RS (n)), and wherein a value set for a switching off offset weighting score (Score_save) depends on a reached value, at the time of the ignition switching off, by a first global reference score (Score_RS_ref) which corresponds to a cumulative sum of the weighting scores of the first dynamic offset (Score_RS (n)).

4. The method according to claim 3 wherein the first global reference score (Score_RS_ref) is compared with increasing score thresholds (S1, S2) which delimit a number N of reliability levels (L1, L2, L3) classified by increasing degree of reliability, and in that the switching off offset weighting score (Score_save) receives a predefined value (Score_save_L1, Score_save_L2, Score_save_L3), associated with a reached reliability level, which is all the higher as the reached reliability level (L1, L2, L3) is high.

5. The method according to claim 4 wherein number N of reliability levels corresponds to exactly three reliability levels.

6. The method according to claim 1 wherein
at least a second estimate (Angle2) of the absolute angular position of the steering wheel is assessed from at least a second model based on analysis of a second rolling parameter representative of the vehicle dynamics, distinct from the first rolling parameter,
a second dynamic offset (OffsetDYN_YR) is assessed which is representative of a difference between the second estimate of the absolute angular position of the steering wheel (Angle2) and the steering wheel relative position (P_relative_SW),
the total compensation offset is calculated by carrying out a weighted average
(i) of first dynamic offsets (OffsetDYN_RS (n)) successively assessed over several successive iterations (n) and each assigned a weighting score for the first dynamic offset (Score_RS (n)),
(ii) of second dynamic offsets (OffsetDYN_YR (n)) successively assessed on said several successive iterations (n) and each assigned a weighting score of second dynamic offset (Score_YR (n)),
(iii) and of the switching off offset (Offset_save) weighted by the switching off offset weighting score (Score_save).

7. The method according to claim 6 wherein the weighting score of the switching off offset (Score_save) is determined as a function of a maximum (X) between on the one hand a first global reference score (Score_RS_ref) equal to the cumulative sum of first dynamic offset weighting scores (Score_RS) and on the other hand a second global reference score (Score_YR_ref) equal to a cumulative sum of second dynamic offset weighting scores (Score_YR).

8. The method according to claim 7 wherein the maximum (X) between the first global reference score (Score_RS_ref) and the second global reference score (Score_YR_ref) is compared with increasing score thresholds (S1, S2) which delimit a number N of reliability levels (L1, L2, L3) classified by increasing degree of reliability, and in that the switching off offset weighting score (Score_save) receives a predefined value (Score_save_L1, Score_save_L2, Score_save_L3), associated with a reached reliability level, which is all the higher as the reached reliability level (L1, L2, L3) is high.

9. The method according to claim 8 wherein number N of reliability levels corresponds to exactly three reliability levels.

10. A power steering device equipped with a computer arranged or programmed to execute a method according to claim 1.

* * * * *